United States Patent
Sano et al.

(10) Patent No.: US 8,526,190 B2
(45) Date of Patent: Sep. 3, 2013

(54) MOBILE TERMINAL APPARATUS, METHOD OF DISPOSING FLEXIBLE BOARD, METHOD OF CORRECTING CLOSING MANIPULATION, AND METHOD OF PREVENTING DAMAGE TO FLEXIBLE BOARD

(75) Inventors: Tatsuya Sano, Tokyo (JP); Sojiro Terayama, Saitama (JP); Masao Matsumoto, Tokyo (JP)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 370 days.

(21) Appl. No.: 12/815,765

(22) Filed: Jun. 15, 2010

(65) Prior Publication Data

US 2011/0164389 A1    Jul. 7, 2011

(30) Foreign Application Priority Data

Jan. 6, 2010   (JP) .................................. 2010-001598

(51) Int. Cl.
*H05K 1/00*   (2006.01)

(52) U.S. Cl.
USPC .......................................................... 361/749

(58) Field of Classification Search
USPC .................. 361/749, 679.01, 679.02, 679.05, 361/679.28, 679.29, 679.56, 752
See application file for complete search history.

(56) References Cited

U.S. PATENT DOCUMENTS

| 7,986,984 B2 * | 7/2011 | Ou ............................. 455/575.4 |
| 2005/0044664 A1 | 3/2005 | Kuramochi |
| 2005/0044665 A1 | 3/2005 | Kuramochi |
| 2008/0074858 A1 | 3/2008 | Hori et al. |
| 2008/0297991 A1 | 12/2008 | Ou |

FOREIGN PATENT DOCUMENTS

JP    2009-267614    11/2009

OTHER PUBLICATIONS

U.S. Appl. No. 12/891,081, filed Sep. 27, 2010, Sano, et al.
U.S. Appl. No. 13/597,736, filed Aug. 29, 2012, Sano.
U.S. Appl. No. 13/572,056, filed Aug. 10, 2012, Sano.
European Office Action dated Mar. 7, 2013 (EP10167408).
Partial European Search Report mailed Jan. 3, 2013 issued in European Application No. 10167408.

* cited by examiner

*Primary Examiner* — Jeremy Norris
*Assistant Examiner* — Tremesha S Willis
(74) *Attorney, Agent, or Firm* — Oblon, Spivak, McClelland, Maier & Neustadt, L.L.P.

(57) ABSTRACT

A mobile terminal apparatus includes upper and lower cases; a sliding-rotation-mechanism performing an opening-direction-sliding-movement through a sliding-supporting plate at opening manipulation, allowing the upper case to stand up at a predetermined angle with respect to the lower case after the opening-direction-sliding-movement, performing closing-direction-rotation-movement, standing up at the predetermined angle through the sliding-supporting plate at closing manipulation, and performing closing-direction-sliding-movement through the sliding-supporting plate after the closing-direction-rotation-movement; and a flexible board disposed so that electrical parts of the upper and lower cases are electrically connected to each other and a portion corresponding to a predetermined length just after the portion exposed from the upper case is adhered to the sliding-supporting plate through an adhesive.

6 Claims, 13 Drawing Sheets

FLEXIBLE BOARD IS PRESSED BY UPPER CASE,
SO THAT IT RETURNS TO CLOSED STATE
WHILE ABRADING LOWER CASE.

MOBILE TERMINAL APPARATUS, METHOD OF DISPOSING FLEXIBLE BOARD, METHOD OF CORRECTING CLOSING MANIPULATION, AND METHOD OF PREVENTING DAMAGE TO FLEXIBLE BOARD

BACKGROUND OF THE INVENTION

1. Field of the Present Invention

The present invention relates to a mobile terminal apparatus, a method of disposing a flexible board, a method of correcting a closing manipulation, and a method of preventing damage to the flexible board which are very appropriately adapted to a portable apparatus such as a mobile phone, a personal handyphone system (PHS) phone, a personal digital Assistant (PDA) apparatus, and a mobile game machine.

2. Description of the Related Art

Recently, there have been disclosed straight type portable apparatuses where a display portion and a manipulation portion are disposed to one case and portable apparatuses which are carried in the state where an upper case to which the display portion and the like are disposed and a lower case to which the manipulation portion and the like are disposed overlap each other.

As the portable apparatuses which are carried in the state where an upper case to which the display portion and the like are disposed and a lower case to which the manipulation portion and the like are disposed overlap each other, there have been disclosed clamshell type portable apparatuses where the upper case and the lower case are rotatably connected to each other through a hinge portion and sliding type portable apparatuses disclosed in, for example, Japanese Unexamined Patent Application Publication No. 2009-267614 where the upper case and the lower case are allowed to slidingly move in the longitudinal directions of the cases.

SUMMARY OF THE INVENTION

The inventors of the invention have developed a mobile terminal apparatus having the sliding type function and the clamshell type function capable of slidingly moving the upper case and the lower case in the transverse directions of the cases from the state where the upper case and the lower case overlap each other and capable of allowing the upper case to stand up inclinedly with respect to the lower case by rotating the upper case when the other end portion of the upper case in the longitudinal direction thereof slidingly moves to the vicinity of the one end portion of the lower case.

In the newly-developed mobile phone, in the case where the mobile phone is to be allowed to return from the open state where the upper case stands up inclinedly with respect to the lower case to the closed state where the cases overlap each other the upper case is firstly allowed to rotate, so that the upper case and the lower case are parallel to each other. Next, by applying the closing-direction force to the upper case that is in the parallel state, the upper case is allowed to be slidingly moved in parallel to the lower case, so that the mobile terminal apparatus is in the closed state. This is the regular manipulation procedure when the mobile phone is allowed to return from the open state to the closed state.

However, it was found out from the performance of an operational test for the newly developed mobile terminal apparatus that, at the time of returning from the open state to the closed state, during the time when the standing upper case is not parallel to the lower case, the upper case may be allowed to be slidingly moved with respect to the lower case.

Although electric parts disposed in the upper case and electric parts disposed in the lower case are electrically connected to each other through a flexible board having flexibility, during the time when the upstanding upper case is not parallel to the lower case, if the upper case is allowed to be slidingly moved with respect to the lower case, the flexible board may be damaged.

The problem may be solved by forcing the user to perform the closing manipulation according to the aforementioned regular manipulation procedure at the time of returning the mobile phone from the open state to the closed state. However, it is not practicable that the user is forced to perform the above manipulation.

It is desirable to provide a sliding rotation mechanism and a mobile terminal apparatus capable of preventing damage to a flexible board even in the case where a closing manipulation is not performed according the aforementioned regular manipulation procedure at the time of returning from an open state to a closed state, which is invented based on a result of the aforementioned operational test.

It is also desirable to provide a mobile terminal apparatus, a method of disposing a flexible board, a method of correcting a closing manipulation, and a method of preventing damage to the flexible board, capable of preventing damage to the flexible board by performing the aforementioned regular manipulation procedure spontaneously without a user paying attention at the time of returning from an open state to a closed state, which is invented based on a result of the aforementioned operational test.

According to an embodiment of the present invention, there is provided a mobile terminal apparatus including: an upper case; a lower case; a sliding rotation mechanism which is fixed to the upper case which performs an opening-direction sliding movement on the upper case through a sliding supporting plate for slide-movably supporting the upper case at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement; and a flexible board which is disposed between the upper case and the lower case so that electrical parts disposed in the upper case and electrical parts disposed in the lower case are electrically connected to each other and of which a portion corresponding to a predetermined length just after the portion exposed from the upper case is adhered to the sliding supporting plate through an adhesive member.

In the above mobile terminal apparatus, a portion corresponding to a predetermined length just after the portion exposed from the upper case, of the flexible board where the electrical parts disposed in the upper case and the electrical parts disposed in the lower case are electrically connected to each other, is adhered to the sliding supporting plate through an adhesive member.

Therefore, the bending of the flexible board that is exposed from the upper case may be prevented. For this reason, even in the case where the closing-direction sliding movement of the upper case is performed before the closing-direction rotation movement of the upper case is ended at the time of performing the closing manipulation, it is possible to prevent the problem of damage to the flexible board, which is caused by abrasion of the flexible board on the lower case due to the pressing of the upper case on the flexible board (that is, it is possible to prevent the problem of the flexible board being damaged, which is caused by not performing the closing manipulation for the mobile phone according to the regular manipulation procedure).

According to another embodiment of the present invention, there is provided a mobile terminal apparatus including: an upper case; a lower case; a sliding rotation mechanism which has a sliding mechanism which is fixed to the upper case to perform a sliding movement on the upper case through a sliding supporting plate for slide-movably supporting the upper case and a rotation mechanism which rotates the upper case with respect to the lower case, which performs an opening-direction sliding movement on the upper case through the sliding supporting plate at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement; and a protrusion member which is fixed to the upper case so as to protrude from the upper case toward the lower case; and a lock block which is fixed to the rotation mechanism so as to rotate in cooperation with the rotation mechanism of the sliding rotation mechanism and which is in contact with the protrusion member disposed to the upper case so as to restrict the sliding movement of the upper case when the upper case is allowed to slidingly move in the closing-direction in the state where the upper case is allowed to stand up at the predetermined angle with respect to the lower case.

In the above mobile terminal apparatus, a lock block is fixed to the rotation mechanism so as to rotate in cooperation with the rotation mechanism of the sliding rotation mechanism, and the lock block is in contact with the protrusion member disposed to the upper case so as to restrict the closing-direction sliding movement of the upper case when the upper case is allowed to slidingly move in the closing-direction in the state where the upper case is allowed to stand up at the predetermined angle with respect to the lower case.

Therefore, it is possible to perform the manipulation of returning the mobile phone from the open state to the closed state according to the regular manipulation procedure spontaneously without the user paying attention (that is, it is possible to correct the user's closing manipulation so as to be the regular manipulation procedure).

According to another embodiment of the present invention, there is provided a mobile terminal apparatus including: an upper case; a lower case; a sliding rotation mechanism which is fixed to the upper case, which has a sliding mechanism which performs sliding movement on the upper case through a sliding supporting plate for slide-movably supporting the upper case and a rotation mechanism which rotates the upper case with respect to the lower case, which performs an opening-direction sliding movement on the upper case through the sliding supporting plate at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement; a protrusion member which is fixed to the upper case so as to protrude from the upper case toward the lower case; a lock block which is fixed to the rotation mechanism so as to rotate in cooperation with the rotation mechanism of the sliding rotation mechanism and which is in contact with the protrusion member disposed to the upper case so as to restrict the sliding movement of the upper case when the upper case is allowed to slidingly move in the closing-direction in the state where the upper case is allowed to stand up at the predetermined angle with respect to the lower case; and a flexible board which is disposed between the upper case and the lower case so that electrical parts disposed in the upper case and electrical parts disposed in the lower case are electrically connected to each other and of which a portion corresponding to a predetermined length just after the portion exposed from the upper case is adhered to the sliding supporting plate through an adhesive member.

In the above mobile terminal apparatus, a portion corresponding to a predetermined length just after the portion exposed from the upper case, of the flexible board where the electrical parts disposed in the upper case and the electrical parts disposed in the lower case are electrically connected to each other, is adhered to the sliding supporting plate through an adhesive member, so that the bending of the flexible board exposed from the upper case is held in check.

In addition, a lock block is fixed to the rotation mechanism so as to rotate in cooperation with the rotation mechanism of the sliding rotation mechanism, and the lock block is in contact with the protrusion member disposed to the upper case so as to restrict the closing-direction sliding movement of the upper case when the upper case is allowed to slidingly move in the closing-direction in the state where the upper case is allowed to stand up at the predetermined angle with respect to the lower case.

Therefore, since the bending of the flexible board is held in check, and since the closing-direction sliding movement is restricted before the closing-direction rotation movement at the time of returning from the open state to the closed state, it is possible to effectively prevent the damage to the flexible board, and it is possible to perform the manipulation of returning the mobile phone from the open state to the closed state according to the regular manipulation procedure spontaneously without the user paying attention (that is, it is possible to correct the user's closing manipulation so as to be the regular manipulation procedure).

According to another embodiment of the present invention, there is provided a method of disposing a flexible board of a mobile terminal apparatus having a sliding rotation mechanism which is fixed to an upper case, which performs an opening-direction sliding movement on the upper case through a sliding supporting plate for slide-movably supporting the upper case at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement, wherein the flexible board is provided so that electrical parts disposed in the upper case and electrical parts disposed in the lower case are electrically connected to each other, and a portion of the flexible board corresponding to a predetermined length just after the portion exposed from the upper case is adhered to the sliding supporting plate through an adhesive member.

Therefore, the bending of the flexible board that is exposed from the upper case may be prevented. For this reason, even in the case where the closing-direction sliding movement of the upper case is performed before the closing-direction rotation movement of the upper case is ended at the time of performing the closing manipulation, it is possible to prevent the problem of damage to the flexible board, which is caused by abrasion of the flexible board on the lower case due to the pressing of the upper case on the flexible board (that is, it is possible to prevent the problem of the flexible board being damaged, which is caused by not performing the closing manipulation for the mobile phone according to the regular manipulation procedure).

According to another embodiment of the present invention, there is provided a method of correcting a closing manipulation for a mobile terminal apparatus having a sliding rotation mechanism which has a sliding mechanism which is fixed to an upper case to perform a sliding movement on the upper case through a sliding supporting plate for slide-movably supporting the upper case and a rotation mechanism which rotates the upper case with respect to a lower case, which performs an opening-direction sliding movement on the upper case through the sliding supporting plate at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement, wherein a protrusion member is fixed to the upper case so as to protrude from the upper case toward the lower case, wherein a lock block that rotates in cooperation with the rotation mechanism of the sliding rotation mechanism is fixed to the rotation mechanism, and wherein the closing manipulation for the mobile terminal apparatus is corrected by restricting the sliding movement of the upper case by allowing the protrusion member disposed in the upper case to be in contact with the lock block when the upper case is allowed to slidingly move in the closing-direction in the state where the upper case is allowed to stand up at a predetermined angle with respect to the lower case.

In the aforementioned method of correcting a closing manipulation, a lock block is fixed to the rotation mechanism so as to rotate in cooperation with the rotation mechanism of the sliding rotation mechanism, and the lock block is in contact with the protrusion member disposed to the upper case so as to restrict the closing-direction sliding movement of the upper case when the upper case is allowed to slidingly move in the closing-direction in the state where the upper case is allowed to stand up at the predetermined angle with respect to the lower case.

Therefore, it is possible to perform the manipulation of returning the mobile phone from the open state to the closed state according to the regular manipulation procedure spontaneously without the user paying attention (that is, it is possible to correct the user's closing manipulation so as to be the regular manipulation procedure).

According to another embodiment of the present invention, there is provided a method of preventing damage to a flexible board provided to a mobile terminal apparatus having a sliding rotation mechanism which has a sliding mechanism which is fixed to an upper case to perform a sliding movement on the upper case through a sliding supporting plate for slide-movably supporting the upper case and a rotation mechanism which rotates the upper case with respect to a lower case, which performs an opening-direction sliding movement on the upper case through the sliding supporting plate at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement, wherein the flexible board is provided so that electrical parts disposed in the upper case and electrical parts disposed in the lower case are electrically connected to each other, and a portion of the flexible board corresponding to a predetermined length just after the portion exposed from the upper case is adhered to the sliding supporting plate through an adhesive member, wherein a protrusion member is fixed to the upper case so as to protrude from the upper case toward the lower case, wherein a lock block that rotates in cooperation with the rotation mechanism of the sliding rotation mechanism is fixed to the rotation mechanism, and wherein the damage to the flexible board is prevented by restricting the sliding movement of the upper case by allowing the protrusion member disposed in the upper case to be in contact with the lock block when the upper case is allowed to slidingly move in the closing-direction in the state where the upper case is allowed to stand up at a predetermined angle with respect to the lower case.

In the aforementioned method of preventing damage to the flexible board, a portion corresponding to a predetermined length just after the portion exposed from the upper case, of the flexible board where the electrical parts disposed in the upper case and the electrical parts disposed in the lower case are electrically connected to each other, is adhered to the sliding supporting plate through an adhesive member, so that the bending of the flexible board exposed from the upper case is held in check.

In addition, a lock block is fixed to the rotation mechanism so as to rotate in cooperation with the rotation mechanism of the sliding rotation mechanism, and the lock block is in contact with the protrusion member disposed to the upper case so as to restrict the closing-direction sliding movement of the upper case when the upper case is allowed to slidingly move in the closing-direction in the state where the upper case is allowed to stand up at the predetermined angle with respect to the lower case.

Therefore, since the bending of the flexible board is held in check, and since the closing-direction sliding movement is restricted before the closing-direction rotation movement at the time of returning from the open state to the closed state, it is possible to effectively prevent the damage to the flexible board, and it is possible to perform the manipulation of returning the mobile phone from the open state to the closed state according to the regular manipulation procedure spontaneously without the user paying attention (that is, it is possible to correct the user's closing manipulation so as to be the regular manipulation procedure).

According to an embodiment of the invention, a portion corresponding to a predetermined length just after the portion exposed from the upper case, of the flexible board where the electrical parts disposed in the upper case and the electrical parts disposed in the lower case are electrically connected to each other, is adhered to the sliding supporting plate through an adhesive member, so that the bending of the flexible board exposed from the upper case may be prevented. Therefore, even in the case where the closing-direction sliding movement of the upper case is performed before the closing-direction rotation movement of the upper case is ended at the time of performing the closing manipulation, it is possible to prevent the problem of damage to the flexible board, which is caused by abrasion of the flexible board on the lower case due to the pressing of the upper case on the flexible board (that is, it is possible to prevent the problem of the flexible board being damaged, which is caused by not performing the closing manipulation for the mobile phone according to the regular manipulation procedure).

In addition, according to another embodiment of the invention, a lock block is fixed to the rotation mechanism so as to rotate in cooperation with the rotation mechanism of the sliding rotation mechanism, and the lock block is in contact with the protrusion member disposed to the upper case so as to restrict the closing-direction sliding movement of the upper case when the upper case is allowed to slidingly move in the closing-direction in the state where the upper case is allowed to stand up at the predetermined angle with respect to the lower case. Therefore, it is possible to perform the manipulation of returning the mobile phone from the open state to the closed state according to the regular manipulation procedure spontaneously without the user paying attention (that is, it is possible to correct the user's closing manipulation so as to be the regular manipulation procedure).

In addition, according to another embodiment of the invention, a portion corresponding to a predetermined length just after the portion exposed from the upper case, of the flexible board where the electrical parts disposed in the upper case and the electrical parts disposed in the lower case are electrically connected to each other, is adhered to the sliding supporting plate through an adhesive member, so that the bending of the flexible board exposed from the upper case is held in check; and a lock block is fixed to the rotation mechanism so as to rotate in cooperation with the rotation mechanism of the sliding rotation mechanism, and the lock block is in contact with the protrusion member disposed to the upper case so as to restrict the closing-direction sliding movement of the upper case when the upper case is allowed to slidingly move in the closing-direction in the state where the upper case is allowed to stand up at the predetermined angle with respect to the lower case.

Therefore, since the bending of the flexible board is held in check, and since the closing-direction sliding movement is restricted before the closing-direction rotation movement at the time of the open state, it is possible to effectively prevent the damage to the flexible board, and it is possible to perform the manipulation of returning the mobile phone from the open state to the closed state according to the regular manipulation procedure spontaneously without the user paying attention (that is, it is possible to correct the user's closing manipulation so as to be the regular manipulation procedure).

DESCRIPTION OF THE PREFERRED EMBODIMENTS

Figure 1:
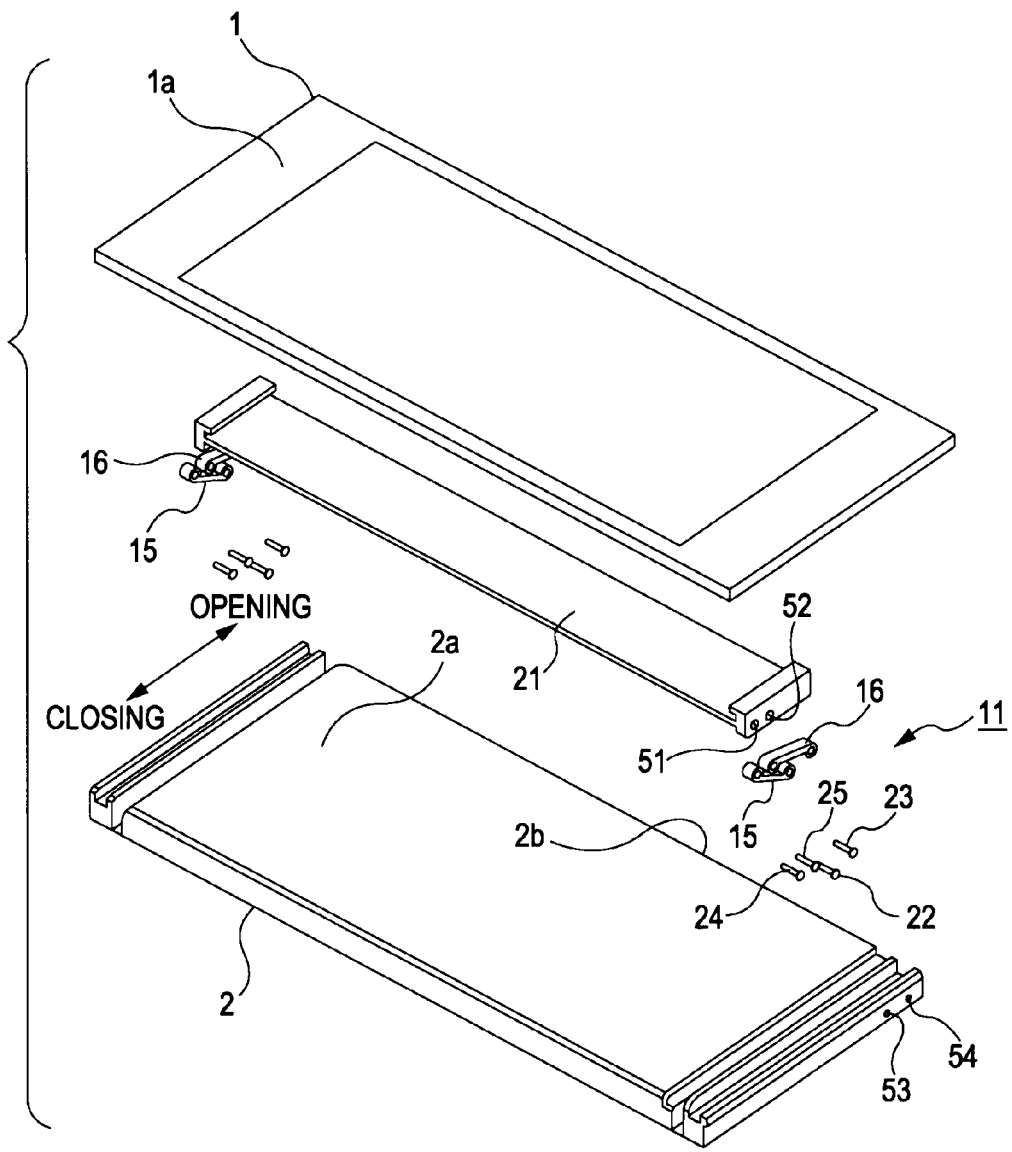
FIG. 1 is an exploded perspective view illustrating a mobile phone according to a first embodiment of the invention.

[First Embodiment]
First, FIG. 1 is an exploded perspective view illustrating main components of a mobile phone according to a first embodiment of the invention. As seen from FIG. 1, the mobile phone according to the first embodiment includes a substantially rectangular upper case 1 and a rectangular lower case 2 having a size substantially equal to that of the upper case 1.

On a front surface portion 1*a* (a surface portion opposite to a surface portion facing the lower case 2) of the upper case 1, a display portion such as a liquid crystal display portion or an organic EL (organic electro luminescent) display portion, an auxiliary manipulation portion, and the like are disposed. On a front surface portion 2*a* (a surface portion facing the upper case 1) of the lower case 2, a main manipulation portion having a plurality of pressing manipulation keys and rotation manipulation keys and the like are disposed.

The display portion, the auxiliary manipulation portion, and the like disposed on the front surface portion 1*a* of the upper case 1 are configured to be exposed irrespective of the sliding positions or the rotation positions of the cases 1 and 2. In addition, the main manipulation portion and the like disposed on the front surface portion 2*a* of the lower case 2 are configured to be exposed only when the mobile terminal apparatus is in the open state through manipulation of the sliding rotation of the upper case 1.

[Sliding Rotation Mechanism]

Figure 2:
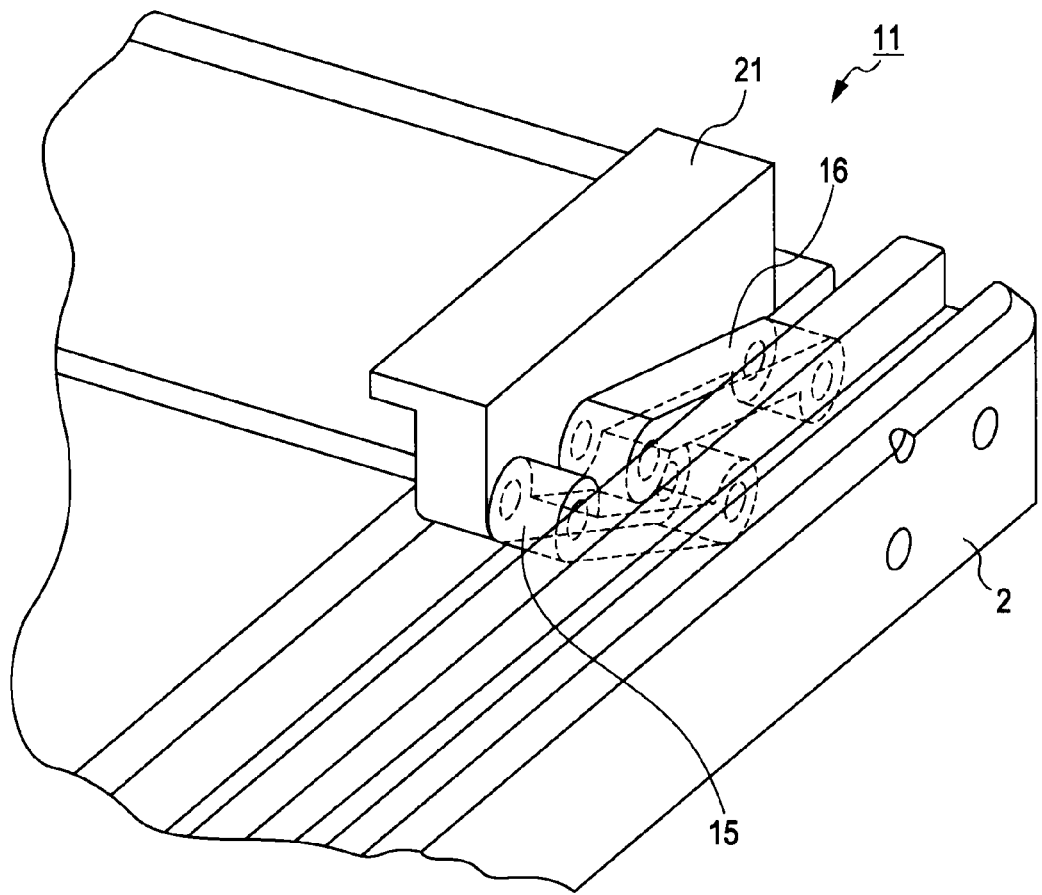
FIG. 2 is an enlarged perspective view illustrating a sliding rotation mechanism of the mobile phone according to the first embodiment.

FIG. 2 is an enlarged perspective view illustrating a sliding rotation mechanism of the mobile phone according to the first embodiment. As shown in FIGS. 1 and 2, the sliding rotation mechanism 11 includes, as basic components, a first arm 15, a second arm 16, a sliding supporting plate 21, and four rotation supporting pins 22 to 25.

An engagement recess portion 51 for rotatably mounting the first arm 15 to the sliding supporting plate 21 and an engagement recess portion 52 for rotatably mounting the second arm 16 to the sliding supporting plate 21 are provided to a ⊃-shaped bending-processed portion and a reversely ⊃-shaped bending-processed portion of the sliding supporting plate 21.

The other end portion of the first arm 15 is rotatably supported by a rotation supporting pin 24 which is engaged with the engagement recess portion 51 of the sliding supporting plate 21. In addition, the other end portion of the second arm 16 is rotatably supported by a rotation supporting pin 25 which is engaged with the engagement recess portion 52 of the sliding supporting plate 21.

In addition, a hole portion 53 for rotatably mounting the first arm 15 and a hole portion 54 for rotatably mounting the second arm 16 are provided to a side surface portion at the short-length side of the lower case 2 corresponding to a disposed position of the sliding rotation mechanism 11. The one end portion of the first arm 15 is rotatably supported by a rotation supporting pin 22 which is provided through the hole portion 53 to the lower case 2. In addition, the one end portion of the second arm 16 is rotatably supported by a rotation supporting pin 23 which is provided through the hole portion 54 to the lower case 2.

The mobile phone has a pair of the sliding rotation mechanisms 11. The one sliding rotation mechanism 11 is disposed on a right side surface in the vicinity of the one end portion 2*b* of the lower case 2, and the other sliding rotation mechanism 11 is disposed on a left side surface in the vicinity of the one end portion 2*b* of the lower case 2.

In addition, although the mobile phone having a pair of the sliding rotation mechanisms 11 is described, the mobile phone may have only one of the sliding rotation mechanisms 11.

[Sliding Rotation Operation]

Figure 3A:
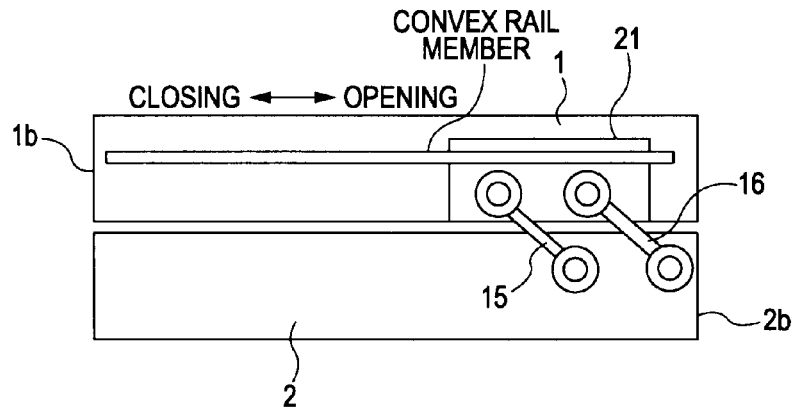
FIGS. 3A to 3C are diagrams illustrating a procedure of a sliding rotation operation of the mobile phone according to the first embodiment.
Figure 3B:
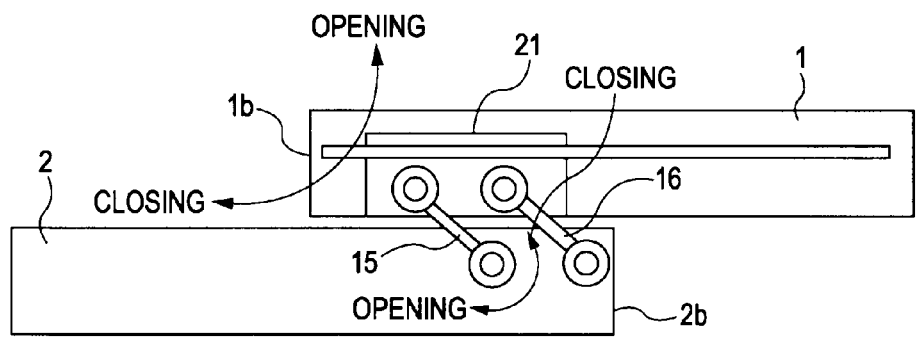

In the case where the mobile phone is to be changed from a closed state where the upper case 1 and the lower case 2 substantially overlap each other as shown in FIG. 3A to an open state where the upper case 1 stands up inclinedly with respect to the lower case 2 as shown in FIG. 3B, a user performs an opening-direction sliding manipulation on the upper case 1 by applying an opening-direction force shown in FIG. 3A to the upper case 1.

If the upper case 1 is slidingly moved in the opening-direction, an end portion 1*b* of the upper case 1 is in contact with the sliding supporting plate 21 as shown in FIG. 3B. If the opening-direction force is further applied to the upper case 1 in this state, the first arm 15 and the second arm 16 rotate about the rotation supporting pins 22 to 25 so as to stand up. Therefore, as shown in FIG. 3C, the upper case 1 may be allowed to stand up at a rotation angle of about 45 degrees with respect to the lower case 2.

[Problems of Closing Manipulation]

Figure 3C:
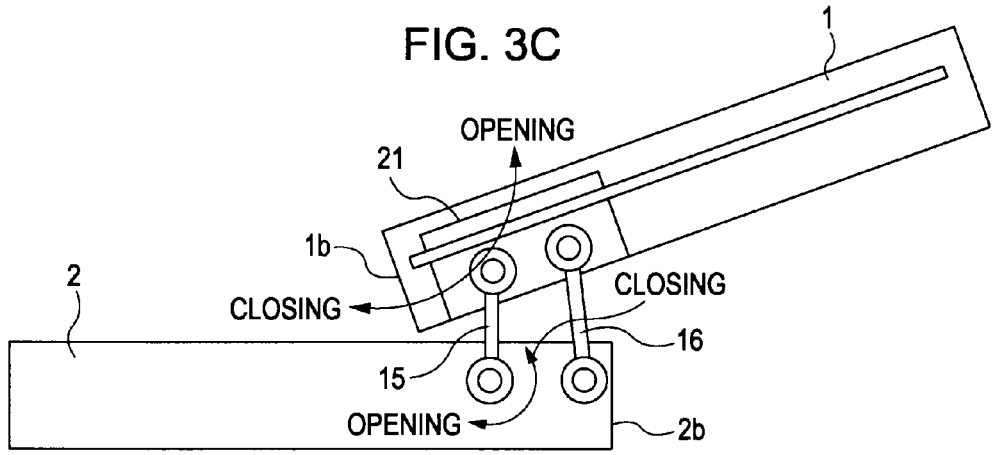

Herein, in the case where the mobile phone is to be allowed to return from the open state where the upper case 1 stands up inclindedly with respect to the lower case 2 as shown in FIG. 3C to the closed state where the upper case 1 and the lower case 2 substantially overlap each other as shown in FIG. 3A, the upper case 1 is firstly allowed to rotate in the closing-direction, so that the upper case 1 and the lower case 2 are parallel to each other. Next, by applying the closing-direction force to the upper case 1 that is in the parallel state, the upper case 1 is allowed to be slidingly moved in the closing-direction in parallel to the lower case 2, so that the mobile terminal apparatus is in the closed state. This is the regular manipulation procedure when the mobile phone is allowed to return from the open state to the closed state.

However, it was found out from carrying out the operational test for the newly developed mobile terminal apparatus that, at the time of returning from the open state to the closed state, during the time when the standing upper case 1 is not parallel to the lower case 2, the upper case 1 may be allowed to be slidingly moved with respect to the lower case 2 in the closing-direction.

Figure 4A:
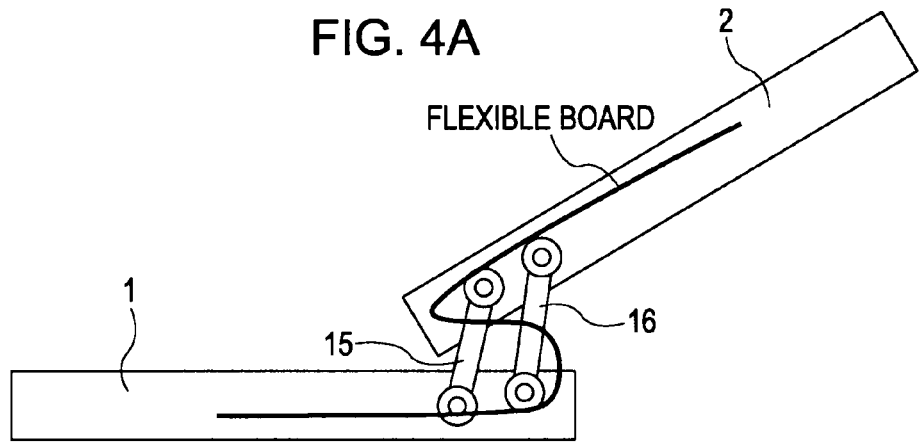
FIGS. 4A to 4C are diagrams illustrating a flexible board disposed in an upper case and a lower case of the mobile phone according to the first embodiment.
Figure 4B:
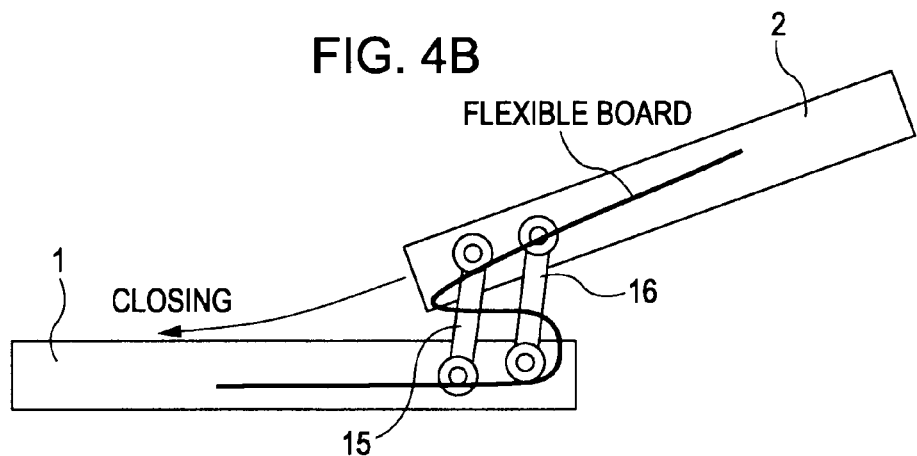

Although electric parts disposed in the upper case 1 and electric parts disposed in the lower case 2 are electrically connected to each other through a flexible board having flexibility as shown in FIG. 4A, in the mobile phone, during the time when the upstanding upper case 1 is not parallel to the lower case 2, the upper case 1 may be allowed to be slidingly moved with respect to the lower case 2 in the closing-direction as indicated by an arrow in FIG. 4B.

Figure 4C:
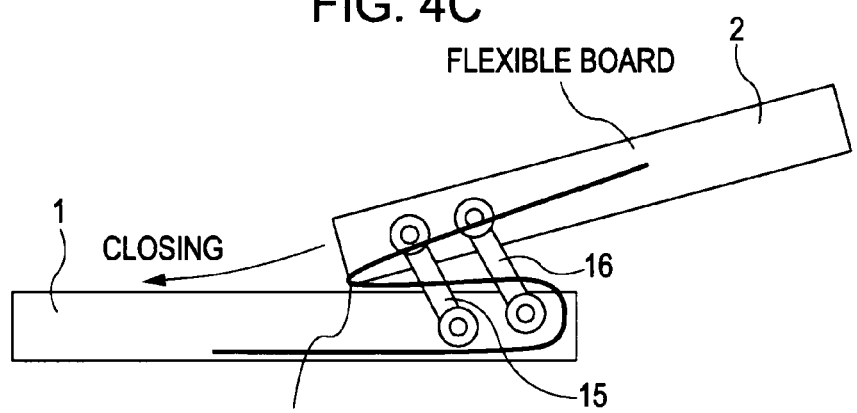

During the time when the upstanding upper case 1 is not parallel to the lower case 2, if the upper case 1 is allowed to be slidingly moved with respect to the lower case 2, as shown in FIG. 4C, the flexible board is pressed by the upper case 1, so that the mobile phone returns to the closed state with the flexible board abraded on the lower case 2. Therefore, in the case of returning the mobile phone from the open state to the closed state, if the regular manipulation procedure is not performed to return the mobile phone to the closed state, the flexible board may be damaged.

The problem may be solved by forcing the user to perform the closing manipulation according to the aforementioned regular manipulation procedure at the time of returning the mobile phone from the open state to the closed state. However, it is not practicable that the user is forced to perform the above manipulation.

[Functions and Effects of Main Components of First Embodiment]

Figure 5:
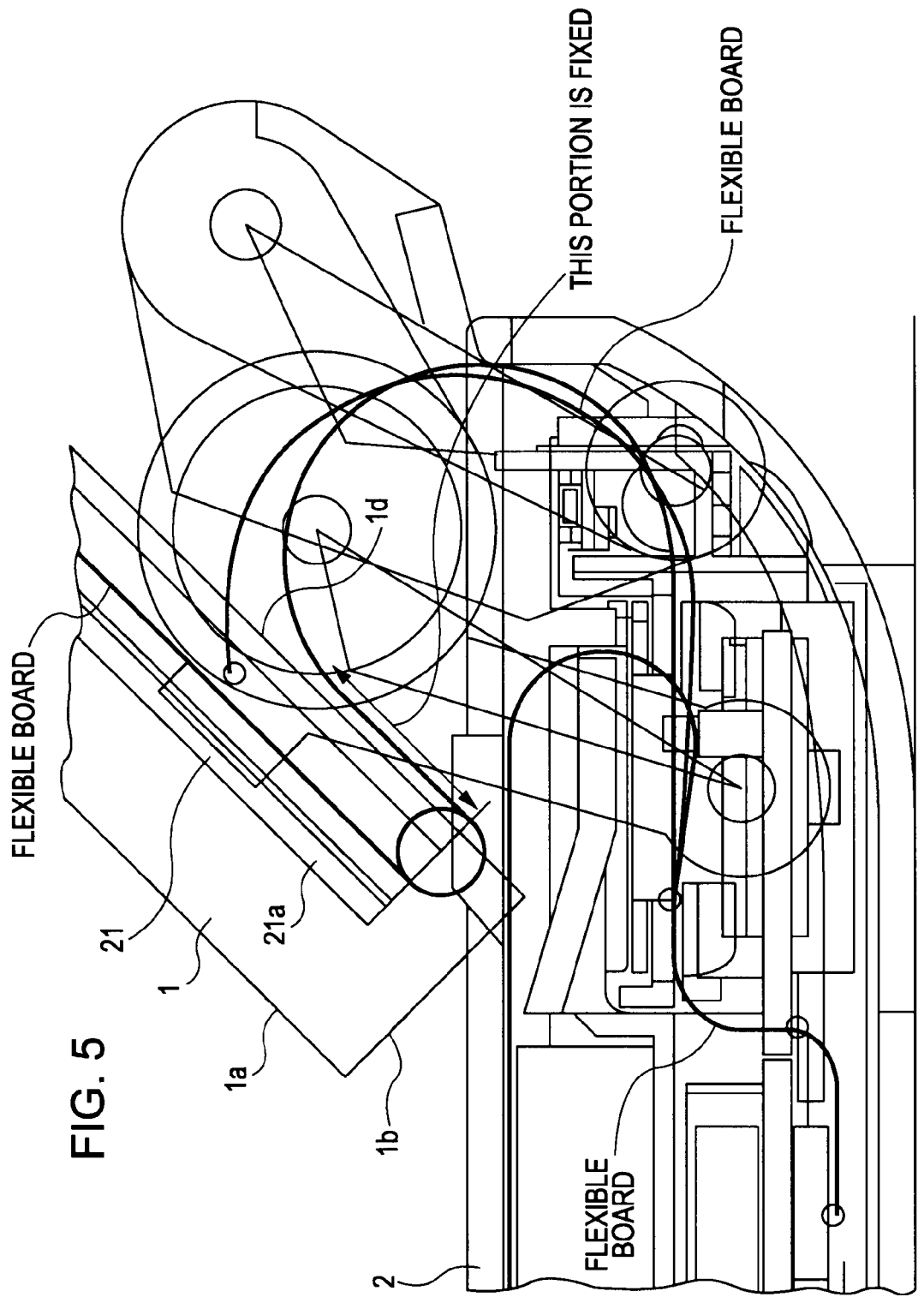
FIG. 5 is a diagram illustrating an adhesion configuration of the flexible board to a sliding supporting plate of the mobile phone according to the first embodiment.

Therefore, in the mobile phone according to the first embodiment, as shown in FIG. 5, about ⅓ of the portion of the flexible board disposed between the upper case 1 and the lower case 2, which is just after the portion exposed from the upper case 1, is adhered to the rear surface portion 1d of the upper case 1 by using an adhesive member such as an adhesive or a double-sided tape.

In the closed state of the mobile phone, since the upper case 1 and lower case 2 overlap with each other, the adhesion position is not seen by a user. In addition, in the open state of the mobile phone, since the adhesive position is in the shadow of the upper case 1, it is very difficult for the user to visually perceive the adhesion position.

Therefore, the flexible board that is disposed from the upper case 1 to the lower case 2 is divided into a sliding flexible board corresponding to the portion received in the upper case 1 from the portion adhered to the rear surface portion 1d of the upper case 1 and a rotation flexible board corresponding to the portion received in the lower case 2 from the portion adhered to the rear surface portion 1d of the upper case 1. Accordingly, the bending occurring in the portion corresponding to the sliding flexible board due to the aforementioned sliding rotation operation occurs only in an internal range of the upper case 1.

Therefore, the bending flexible board does not greatly protrude outside the upper case 1 due to the aforementioned sliding rotation operation, and as described with reference to FIG. 4C, during the time when the standing upper case 1 is not parallel to the lower case 2, even in the case where the upper case 1 is allowed to be slidingly moved with respect to the lower case 2, the flexible board is pressed by the upper case 1, so that the problem of the flexible board being damaged due to the abrasion on the lower case 2 may be prevented (the problem of the flexible board being damaged due to not performing the closing manipulation of the mobile phone according to the regular manipulation procedure may be prevented).

In addition, since the problem of the flexible board being damaged due to not performing the closing manipulation of the mobile phone according to the regular manipulation procedure may be prevented, it is not necessary for the user to perform the closing manipulation so as for the mobile phone to return from the open state to the closed state according to the regular manipulation procedure.

[Second Embodiment]

Next, a mobile phone according to a second embodiment of the invention is described. In the aforementioned mobile phone according to the first embodiment, a portion of the flexible board just after the portion which is exposed from the upper case 1 is adhered to the rear surface portion 1d of the upper case 1, so that the damage to the flexible board at the time of the closing manipulation is prevented.

However, in the mobile phone according to the second embodiment, the closing-direction sliding movement of the upper case 1 is configured not to be performed at the time of returning the mobile phone from the open state to the closed state during the time when the closing-direction rotation manipulation of the upper case 1 is not ended, so that the damage to the flexible board at the time of the closing manipulation is prevented by allowing the user to perform the closing manipulation according to the regular manipulation procedure spontaneously without the user paying attention.

[Configuration of Mobile Phone of Second Embodiment]

Figure 6:
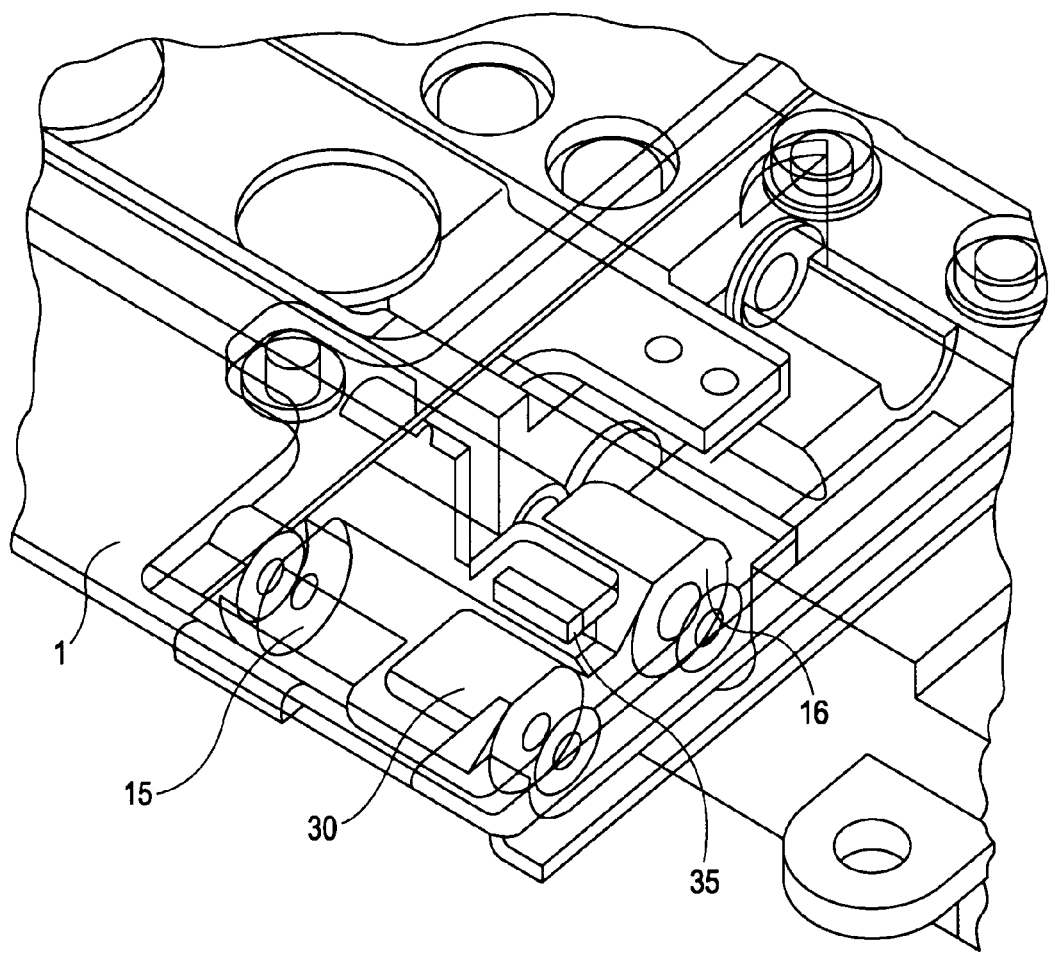
FIG. 6 is a perspective view illustrating a perspectively-seen state of main components of a mobile phone according to a second embodiment of the invention.
Figure 7:
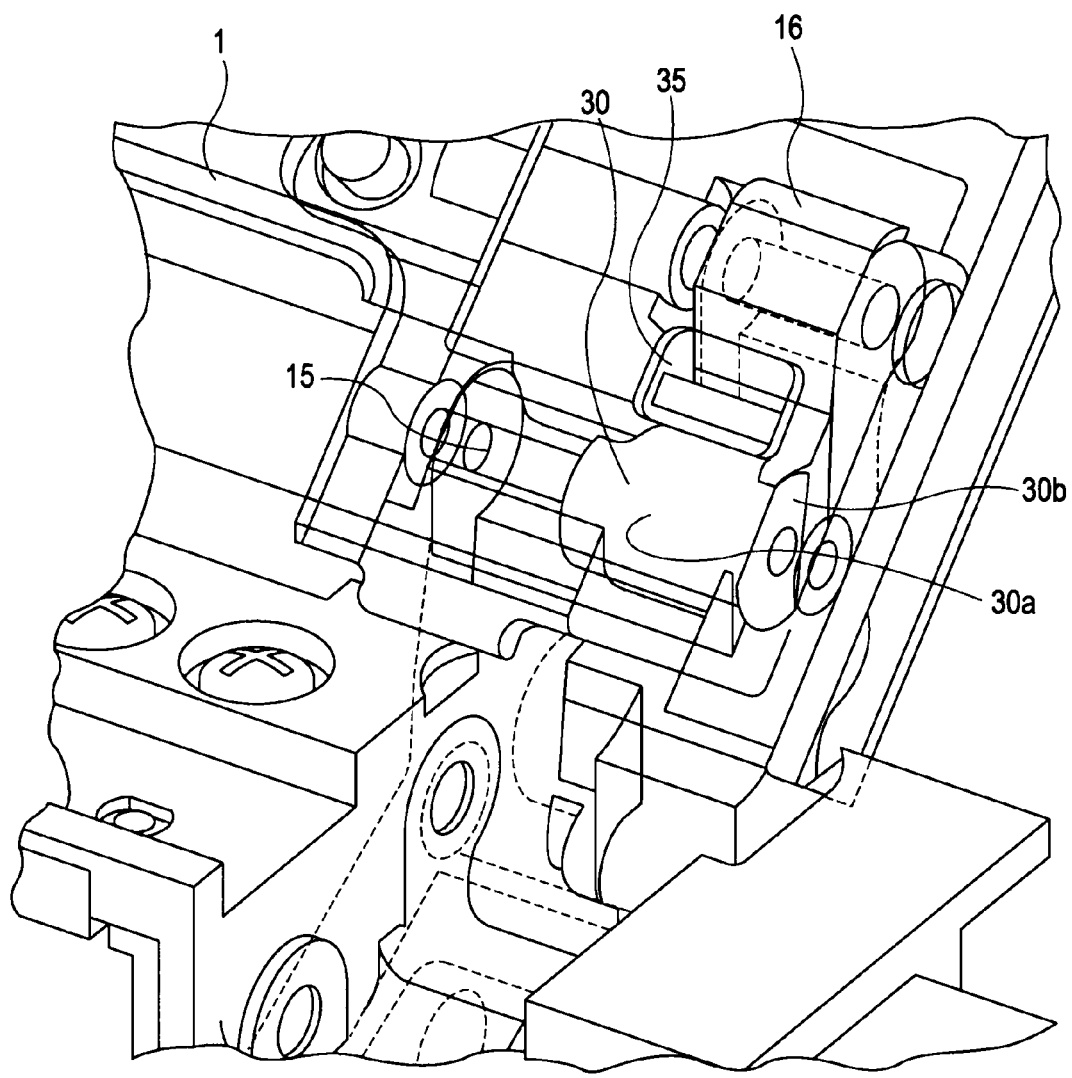
FIG. 7 is a perspective view illustrating a perspectively-seen state of main component of the mobile phone according to the second embodiment, as seen in another direction.

The mobile phone according to the second embodiment includes a lock block 30 which is fixed to the first arm 15 with the same axis as that of the first arm 15 as shown in FIGS. 6 and 7 to rotate together with the first arm 15.

The lock block 30 has a cylindrical shape. The so-called D-cut process of cutting a portion of the circumferential surface straightly in the direction of the central axis is performed on the lock block 30, so that the cross section in the diameter direction has a shape of D.

In addition, the mobile phone includes a protrusion member 35 which is provided to the upper case 1 to protrude from the upper case 1 toward the lock block 30. During the time when the closing-direction rotation operation of the upper case 1 is performed at the time of the closing manipulation of the mobile phone, the protrusion member 35 is in contact with a curved surface portion 30a of the circumferential surface of the lock block 30, so that the transfer to the closing-direction sliding operation during the rotation operation is restricted. At the time when the closing-direction rotation operation of the upper case 1 is ended, the protrusion member 35 is located on a flat surface portion 30b of the lock block 30, so that the transfer to the closing-direction sliding operation may be performed.

[Opening Operation of Mobile Phone of Second Embodiment]

Figure 8A:
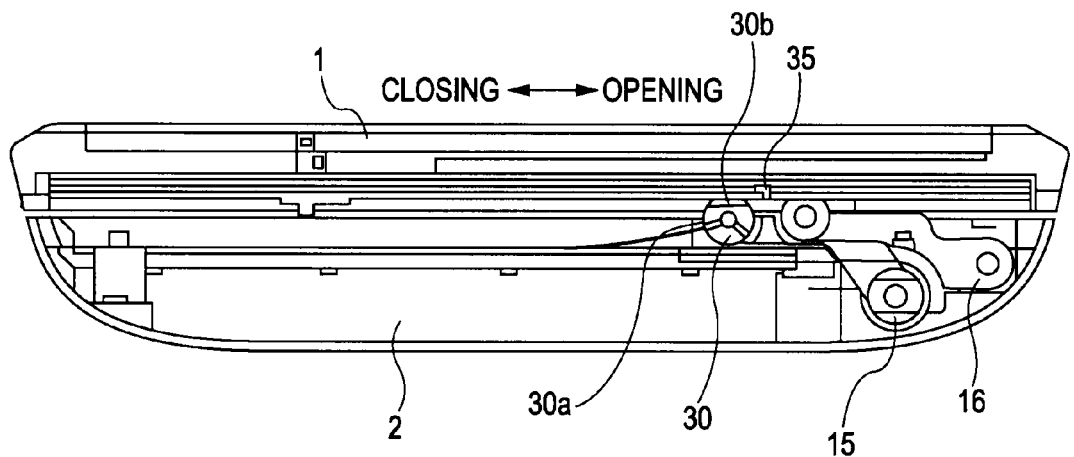
FIGS. 8A and 8B are diagrams illustrating an opening operation of the mobile phone according to the second embodiment of the invention.

In the mobile phone according to the second embodiment, in the case where the mobile phone is to be changed from a closed state where the upper case 1 and the lower case 2 substantially overlap each other as shown in FIG. 8A to an open state where the upper case 1 stands up inclinedly with respect to the lower case 2, a user performs an opening-direction sliding manipulation on the upper case 1 by applying an opening-direction force shown in FIG. 8A to the upper case 1.

In the closed state, as shown in FIG. 8A, the flat surface portion 30b of the lock block 30 is substantially parallel to the lower case 2. In addition, the protrusion member 35 which is provided to the upper case 1 so as to protrude from the upper case 1 to the side of the lower case 2 is not in contact with the lock block 30.

Figure 8B:
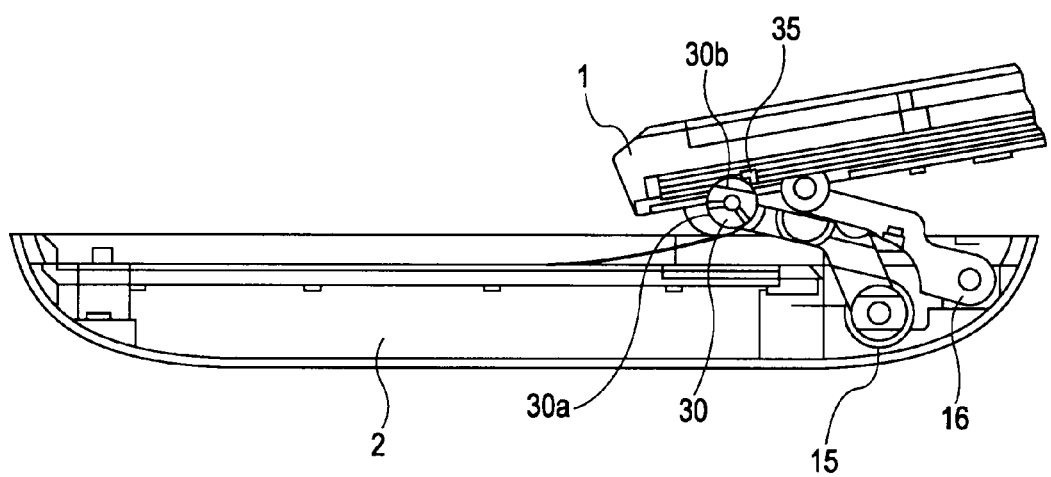

If the upper case 1 is slidingly moved in the opening-direction, an end portion of the upper case 1 is in contact with a sliding supporting plate 21. If the force in the sliding direction is further applied to the upper case 1 in this state, the opening-direction rotation of the first arm 15 and the opening-direction rotation of the second arm 16 start by using the rotation supporting pins 22 to 25 as the rotation axes as shown in FIG. 8B.

Figure 9:
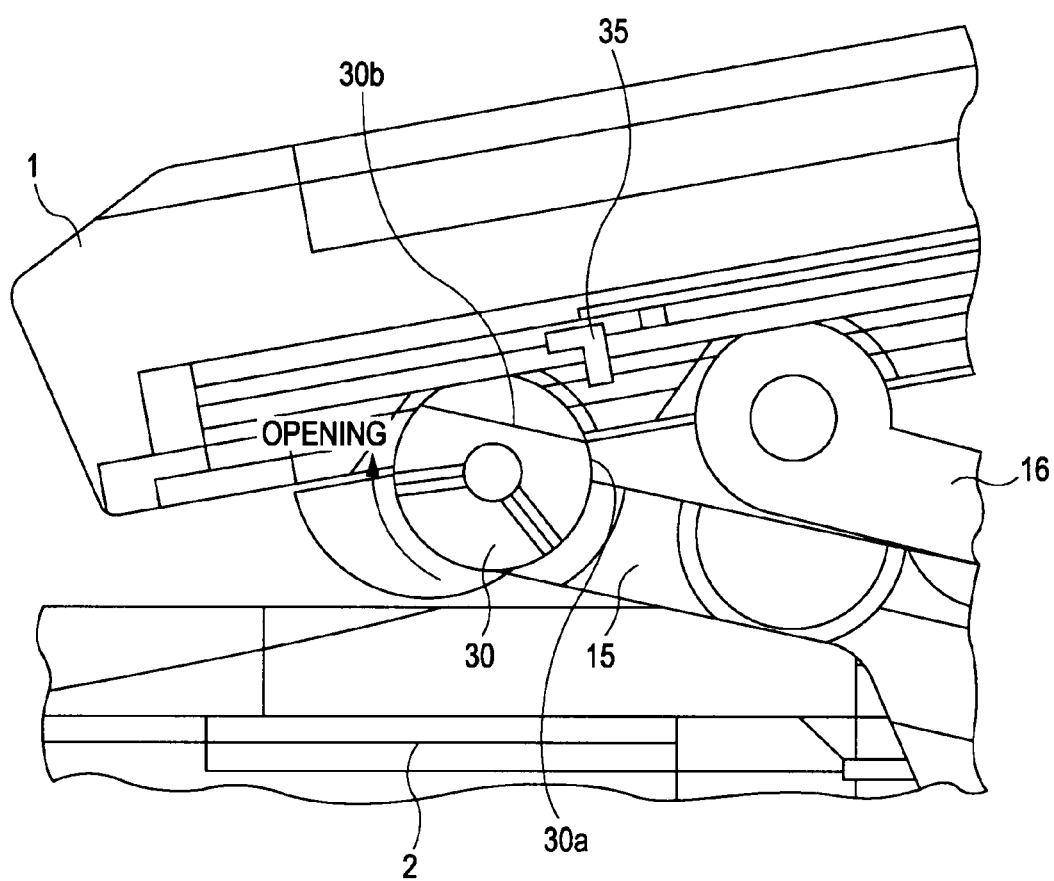
FIG. 9 is a diagram illustrating main components at an opening operation time of the mobile phone according to the second embodiment of the invention.

FIG. 9 illustrates states of the first arm 15 and the second arm 16 at the time of starting the rotation. As seen from FIG. 9, if the arms 15 and 16 start the opening-direction rotation, the lock block 30 that is fixed to the first arm 15 also starts the opening-direction rotation indicated by the arrow of FIG. 9 in cooperation with the rotation of the first arm 15.

Figure 10:
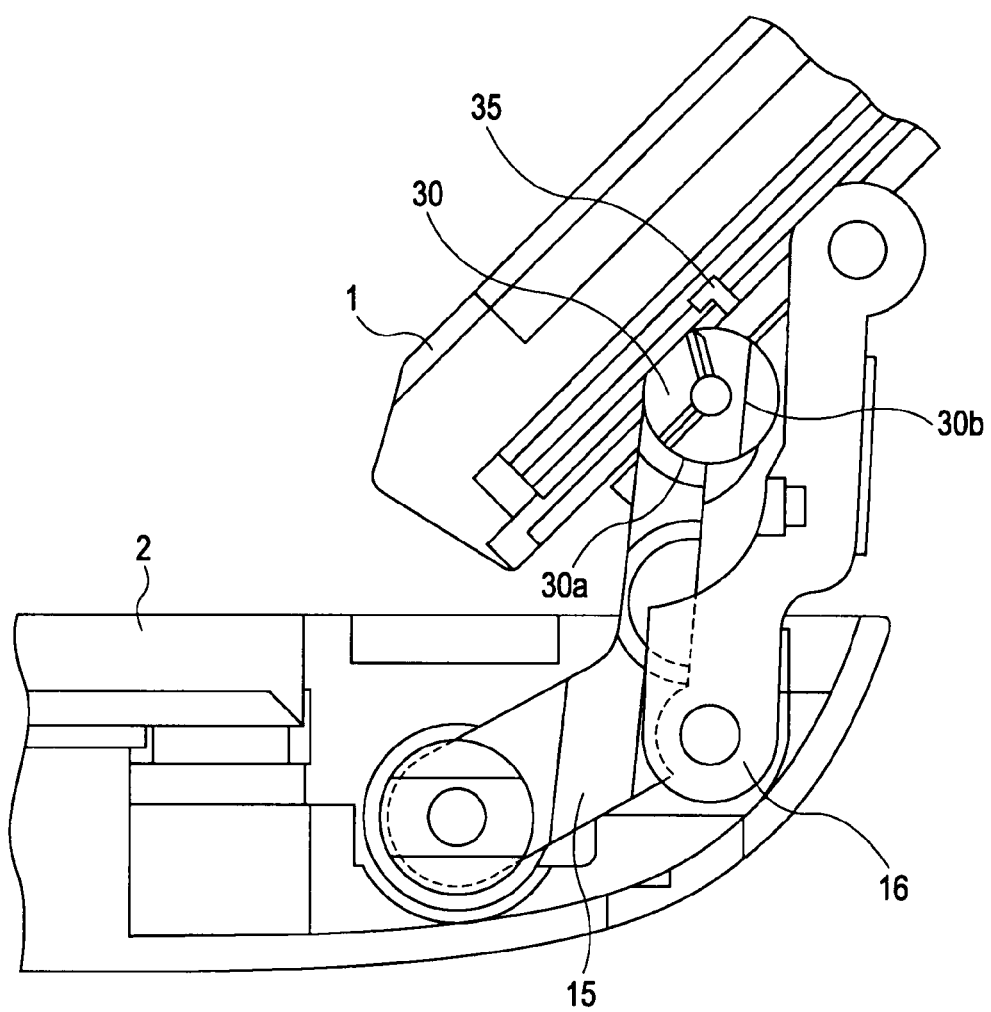
FIG. 10 is a diagram illustrating main components at an open state of the mobile phone according to the second embodiment of the invention.

In addition, when the rotation angle of the upper case 1 is about 45 degrees with respect to the lower case 2 as shown in FIG. 10, the rotation of the arms 15 and 16 is allowed to stop. Therefore, the upper case 1 is allowed to stand up at a rotation angle of about 45 degrees with respect to the lower case 2, so that mobile phone is in the open state. In the open state, the flat surface portion 30b of the lock block 30 is substantially perpendicular to the lower case 2 as shown in FIG. 10.

[Closing Operation of Mobile Phone of Second Embodiment]

Next, in the case where the mobile phone is to be allowed to return from the open state to the closed state, it is necessary to perform a procedure of firstly allowing the upper case 1 and the lower case 2 to be parallel to each other by rotating the upper case 1 in the closing-direction and, after that, slidingly moving the upper case 1 in the closing-direction in parallel to the lower case 2 by applying a force for the closing-direction sliding movement to the upper case 1, which is in the parallel state.

However, a procedure of applying the force for the closing-direction sliding movement to the upper case 1 without the closing-direction rotation of the upper case 1, a procedure of applying the force for the closing-direction sliding movement to the upper case 1 in the state where the upper case 1 is allowed to slightly rotate in the closing-direction, or a procedure of applying the force for the closing-direction sliding movement to the upper case 1 during the time when the upper case 1 is allowed to rotate in the closing-direction may be considered.

Figure 11:
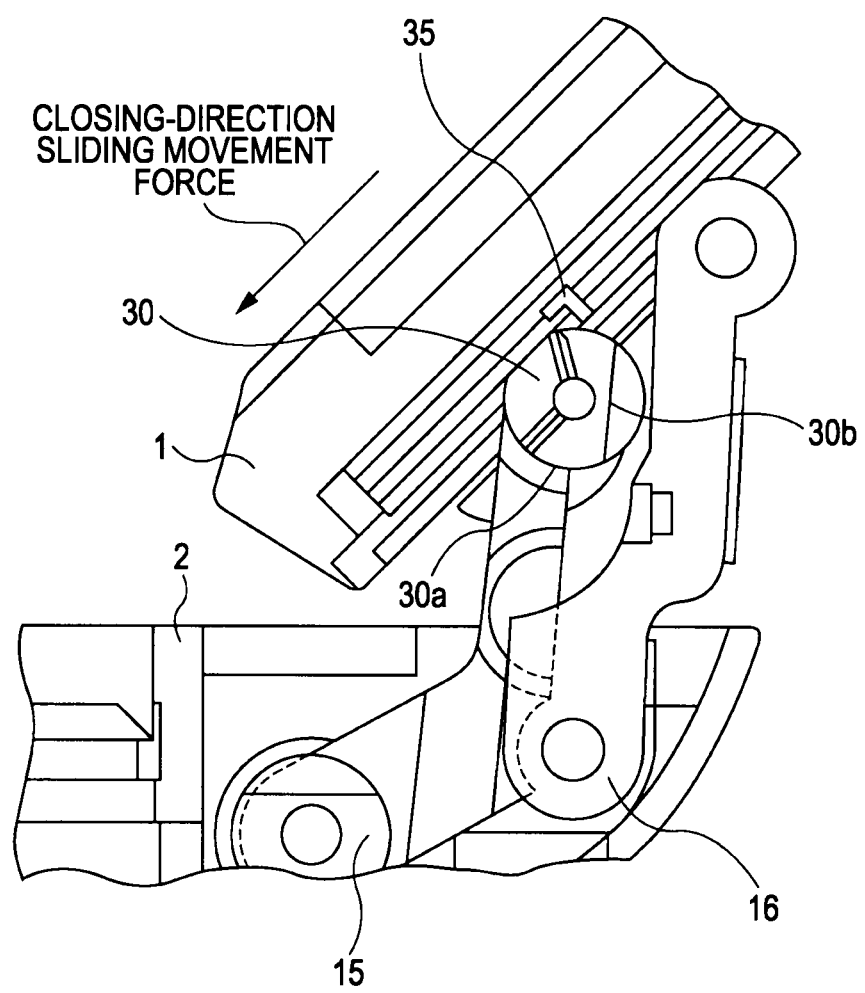
FIG. 11 is a diagram illustrating a state where sliding manipulation is restricted when the sliding manipulation is performed before rotation manipulation is performed at the time of a closing operation of the mobile phone according to the second embodiment of the invention.

In the mobile phone according to the second embodiment, in the case where the force for the closing-direction sliding movement is applied to the upper case 1 without the closing-direction rotation of the upper case 1 or the case where the force for the closing-direction sliding movement is applied to the upper case 1 in the state where the upper case 1 is allowed to slightly rotate in the closing-direction, the protrusion member 35 that protrudes from the upper case 1 is in contact with the curved surface portion 30a of the lock block 30 as shown in FIG. 11, so that the closing-direction sliding movement of the upper case 1 is restricted.

Therefore, in the open state of the mobile phone, in the case where the force for the closing-direction sliding movement is applied to the upper case 1 without the closing-direction rotation of the upper case 1 or the case where the force for the closing-direction sliding movement is applied to the upper case 1 in the state where the upper case 1 is allowed to slightly rotate in the closing-direction, the closing-direction sliding movement of the upper case 1 may be restricted. In this state, since the user may not slidingly move the upper case 1 in the closing-direction, the user performs the closing-direction rotation manipulation on the upper case 1.

Figure 12:
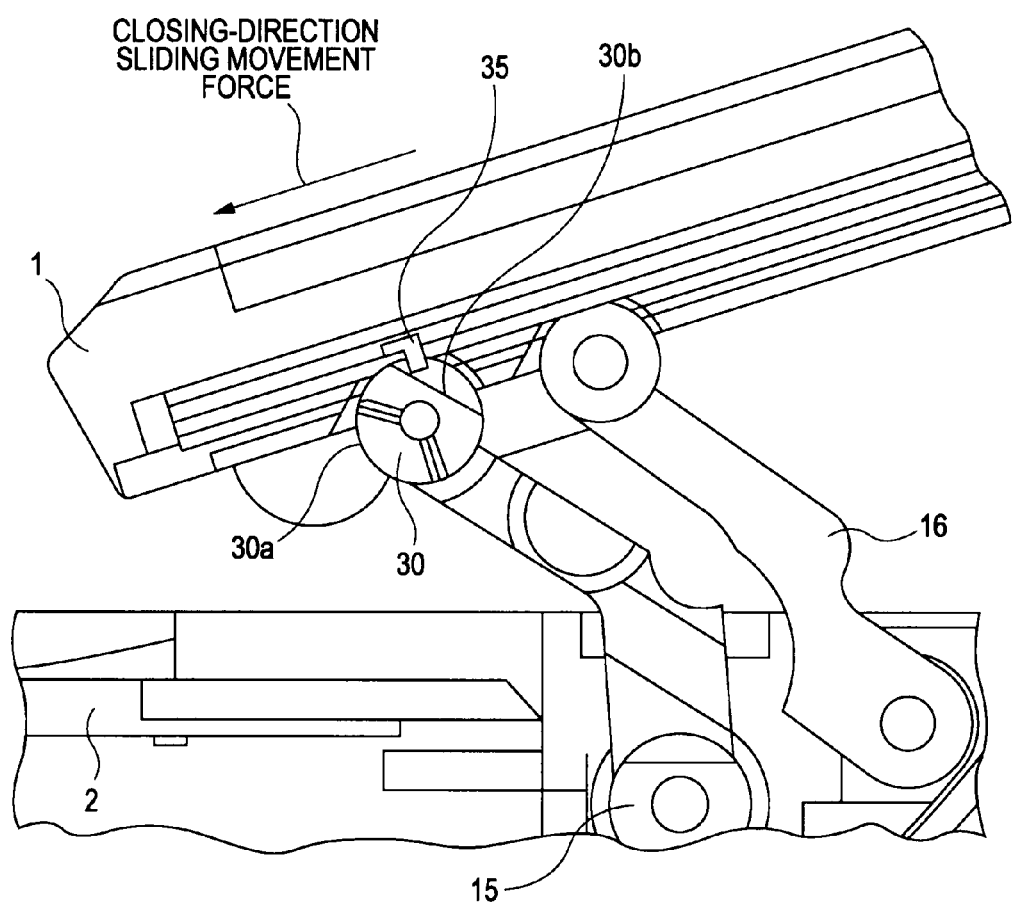
FIG. 12 is a diagram illustrating a state where rotation manipulation of arms is accelerated (supported) when sliding manipulation from slight rotation manipulation is performed at the time of a closing operation of the mobile phone according to the second embodiment of the invention.

On the other hand, in the case where the force for the closing-direction sliding movement is applied to the upper case 1 during the time when the upper case 1 is allowed to rotate in the closing-direction, the protrusion member 35 that protrudes from the upper case 1 is in contact with the flat surface portion 30b of the lock block 30 as shown in FIG. 12, so that the restriction on the closing-direction sliding movement of the upper case 1 is released. In addition, since the protrusion member 35 is in contact with the flat surface portion 30b of the lock block 30, the first arm 15 is pressed so as to rotate in the closing direction by the protrusion member 35. In other words, if the protrusion member 35 is in contact with the flat surface portion 30b of the lock block 30, the force applied by the closing-direction sliding manipulation is converted into the force for rotating the first arm 15 in the closing-direction.

Figure 13:
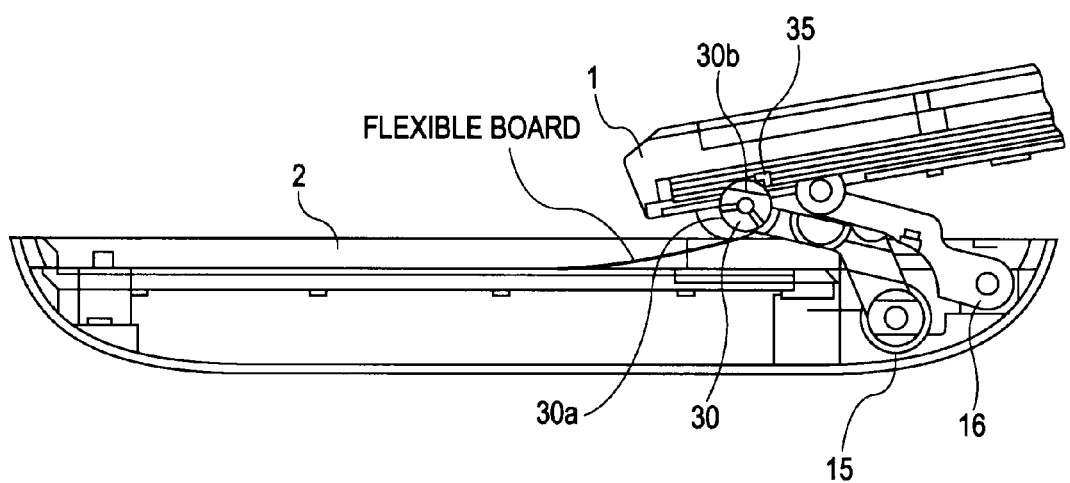
FIG. 13 is a diagram illustrating a state of the mobile phone according the second embodiment of the invention just before a rotation operation thereof is ended.

Therefore, as shown in FIG. 13, it is possible to accelerate the closing-direction rotation operation of the upper case 1 (that is, it is possible to support the closing-direction rotation operation), and it is possible to return the mobile phone to the closed state as shown in FIG. 8A by transferring to the closing-direction sliding manipulation for the upper case 1 after the closing-direction rotation of the upper case 1 is ended.

In other words, in the mobile phone according to the second embodiment, in the case where the closing-direction rotation manipulation that is performed at the time of returning the mobile phone from the open state to the closed state is a rotation manipulation within a range where the protrusion member 35 is in contact with the curved surface portion 30a of the lock block 30, although the closing-direction sliding manipulation is performed, by allowing the protrusion member 35 to be in contact with the curved surface portion 30a of the lock block 30, the closing-direction sliding manipulation is restricted.

On the other hand, in the case where the closing-direction rotation manipulation that is performed at the time of returning the mobile phone from the open state to the closed state is a rotation manipulation within a range where the protrusion member 35 is in contact with the flat surface portion 30a of the lock block 30, by allowing the protrusion member 35 to be in contact with the flat surface portion 30a of the lock block 30, the restriction on the closing-direction sliding manipulation is released. In addition, by allowing the protrusion member 35 to be in contact with the flat surface portion 30b of the lock block 30, the closing-direction rotation of the first arm 15 may be accelerated, and the closing-direction sliding manipulation may be performed.

[Effect of Second Embodiment]

As clarified from the above description, in the mobile phone according to the second embodiment, due to the lock block 30 that rotates together with the first arm 15 and the protrusion member 35 that protrudes from the upper case 1, in the case where the force for the closing-direction sliding movement is applied to the upper case 1 without the closing-direction rotation of the upper case 1 or the case where the force for the closing-direction sliding movement is applied to the upper case 1 in the state where the upper case 1 is allowed to slightly rotate in the closing-direction, the closing-direction sliding manipulation of the upper case 1 is restricted.

In addition, in the case where the force for the closing-direction sliding movement is applied to the upper case 1 during the time when the upper case 1 is allowed to rotate in the closing-direction, the closing-direction rotation operation of the upper case 1 is accelerated (that is, the closing-direction rotation operation is supported), and after the closing-direction rotation of the upper case 1 is ended, the procedure is transferred to the closing-direction sliding manipulation for the upper case 1.

Therefore, it is possible to perform the manipulation of returning the mobile phone from the open state to the closed state according to the regular manipulation procedure spontaneously without the user paying attention (that is, it is possible to correct the user's closing manipulation so as to be the regular manipulation procedure).

In addition, since the manipulation of returning the mobile phone from the open state to the closed state may be performed according to the regular manipulation procedure, it is possible to prevent the problem of damage to the flexible board, which is caused by the returning of the mobile phone to the closed state with the flexible board abraded on the lower case 2 due to the pressing of the upper case 1 on the flexible board when the closing-direction sliding manipulation is performed before the closing-direction rotation of the upper case 1 is ended in the open state of the mobile phone (that is, it is possible to prevent the problem of the flexible board being damaged, which is caused by not performing the closing manipulation for the mobile phone according to the regular manipulation procedure).

In addition, since the problem of the flexible board being damaged due to not performing the closing manipulation of the mobile phone according to the regular manipulation procedure may be prevented, it is not necessary for the user to perform the closing manipulation so as for the mobile phone to return from the open state to the closed state according to the regular manipulation procedure.

[Third Embodiment]

Next, a mobile phone according to a third embodiment of the invention is described. In the aforementioned mobile phone according to the first embodiment, a portion of the flexible board just after the portion which is exposed from the upper case 1 is adhered to the rear surface portion 1d of the upper case 1, so that the damage to the flexible board at the time of the closing manipulation is prevented.

In addition, in the aforementioned mobile phone according to the second embodiment, at the time of returning the mobile phone from the open state to the closed state, during the time when the closing-direction rotation manipulation of the upper case 1 is not ended, the closing-direction sliding movement of the upper case 1 is configured not to be performed, so that the damage to the flexible board at the time of the closing manipulation is prevented by allowing the user to perform the closing manipulation according to the regular manipulation procedure spontaneously without the user paying attention.

However, in the mobile phone according to the third embodiment, a portion of the flexible board just after the portion which is exposed from the upper case 1 is adhered to the rear surface portion 1d of the upper case 1, and the closing-direction sliding movement of the upper case 1 is configured not to be performed at the time of returning the mobile phone from the open state to the closed state during the time when the closing-direction rotation manipulation of the upper case 1 is not ended, so that the damage to the flexible board at the time of the closing manipulation may be more effectively prevented, and so that the user may be allowed to perform the closing manipulation according to the regular manipulation procedure spontaneously without the user paying attention.

[Configuration of Mobile Phone of Third Embodiment]

In the mobile phone according to the third embodiment, as shown in FIG. 5, about ⅓ of the portion of the flexible board disposed between the upper case 1 and the lower case 2, which is just after the portion exposed from the upper case 1, is adhered to the rear surface portion 1d of the upper case 1 by using an adhesive member such as an adhesive or a double-sided tape.

In the closed state of the mobile phone, since the upper case 1 and lower case 2 overlap with each other, the adhesion position is not seen by a user. In addition, in the open state of the mobile phone, since the adhesive position is in the shadow of the upper case 1, it is very difficult for the user to visually perceive the adhesion position.

In addition, the mobile phone according to the third embodiment includes a lock block 30 which is fixed to the first arm 15 with the same axis as that of the first arm 15 as shown in FIGS. 6 and 7 to rotate together with the first arm 15.

The lock block 30 has a cylindrical shape. The so-called D-cut process of cutting a portion of the circumferential surface straightly in the direction of the central axis is performed on the lock block 30, so that the cross section in the diameter direction has a shape of D.

In addition, the mobile phone includes a protrusion member 35 which is provided to the upper case 1 to protrude from the upper case 1 toward the lock block 30. During the time when the closing-direction rotation operation of the upper case 1 is performed at the time of the closing manipulation of the mobile phone, the protrusion member 35 is in contact with a curved surface portion 30a of the circumferential surface of the lock block 30, so that the transfer to the closing-direction sliding operation during the rotation operation is restricted. At the time when the closing-direction rotation operation of the upper case 1 is ended, the protrusion member 35 is located on a flat surface portion 30b of the lock block 30, so that the transfer to the closing-direction sliding operation may be performed.

[Opening Operation of Mobile Phone of Third Embodiment]

In the mobile phone according to the third embodiment, in the case where the mobile phone is to be changed from a closed state where the upper case 1 and the lower case 2 substantially overlap each other as shown in FIG. 8A to an open state where the upper case 1 stands up inclinedly with respect to the lower case 2, a user performs an opening-direction sliding manipulation on the upper case 1 by applying an opening-direction force shown in FIG. 8A to the upper case 1.

In the closed state, as shown in FIG. 8A, the flat surface portion 30b of the lock block 30 is substantially parallel to the lower case 2. In addition, the protrusion member 35 which is provided to the upper case 1 so as to protrude from the upper case 1 to the side of the lower case 2 is not in contact with the lock block 30.

If the upper case 1 is slidingly moved in the opening-direction, an end portion of the upper case 1 is in contact with a sliding supporting plate 21. If the force in the sliding direction is further applied to the upper case 1 in this state, the opening-direction rotation of the first arm 15 and the opening-direction rotation of the second arm 16 start by using the rotation supporting pins 22 to 25 as the rotation axes as shown in FIG. 8B.

FIG. 9 illustrates states of the first arm 15 and the second arm 16 at the time of starting the opening direction rotation. As seen from FIG. 9, if the arms 15 and 16 start the opening-direction rotation, the lock block 30 that is fixed to the first arm 15 also starts the opening-direction rotation indicated by the arrow of FIG. 9 in cooperation with the rotation of the first arm 15.

In addition, when the rotation angle of the upper case 1 is about 45 degrees with respect to the lower case 2 as shown in FIG. 10, the rotation of the arms 15 and 16 is allowed to stop. Therefore, the upper case 1 is allowed to stand up at a rotation angle of about 45 degrees with respect to the lower case 2, so that mobile phone is in the open state. In the open state, the flat surface portion 30b of the lock block 30 is substantially perpendicular to the lower case 2 as shown in FIG. 10.

[Closing Operation of Mobile Phone of Third Embodiment]

Next, in the case where the mobile phone according to the third embodiment is to be allowed to return from the open state to the closed state, it is necessary to perform a procedure of firstly allowing the upper case 1 and the lower case 2 to be parallel to each other by rotating the upper case 1 in the closing-direction and, after that, slidingly moving the upper case 1 in the closing-direction in parallel to the lower case 2 by applying a force for the closing-direction sliding movement to the upper case 1, which is in the parallel state.

However, a procedure of applying the force for the closing-direction sliding movement to the upper case 1 without the closing-direction rotation of the upper case 1, a procedure of applying the force for the closing-direction sliding movement to the upper case 1 in the state where the upper case 1 is allowed to slightly rotate in the closing-direction, or a procedure of applying the force for the closing-direction sliding movement to the upper case 1 during the time when the upper case 1 is allowed to rotate in the closing-direction may be considered. In addition, in this state, if the force for the closing-direction sliding movement is applied to the upper case 1, the problem of the flexible board being damaged occurs as described above.

Therefore, in the mobile phone according to the third embodiment, as shown in FIG. 5, about ⅓ of the portion of the flexible board disposed between the upper case 1 and the lower case 2, which is just after the portion exposed from the upper case 1, is adhered to the rear surface portion 1d of the upper case 1 by using an adhesive member such as an adhesive or a double-sided tape.

Therefore, the flexible board that is disposed from the upper case 1 to the lower case 2 is divided into a sliding flexible board corresponding to the portion received in the upper case 1 from the portion adhered to the rear surface portion 1*d* of the upper case 1 and a rotation flexible board corresponding to the portion received in the lower case 2 from the portion adhered to the rear surface portion id of the upper case 1. Accordingly, the bending occurring in the portion corresponding to the sliding flexible board due to the aforementioned sliding rotation operation occurs only in an internal range of the upper case 1.

Therefore, due to the aforementioned sliding rotation operation, the bending flexible board does not greatly protrude outside the upper case 1, and as described with reference to FIG. 4C, it is possible to prevent the problem of the flexible board being damaged due to insertion of the flexible board between the upper case 1 and the lower case 2.

In addition, in the mobile phone according to the third embodiment, in the case where the force for the closing-direction sliding movement is applied to the upper case 1 without the closing-direction rotation of the upper case 1 or the case where the force for the closing-direction sliding movement is applied to the upper case 1 in the state where the upper case 1 is allowed to slightly rotate in the closing-direction, the protrusion member 35 that protrudes from the upper case 1 is in contact with the curved surface portion 30*a* of the lock block 30 as shown in FIG. 11, so that the closing-direction sliding movement of the upper case 1 is restricted.

Therefore, in the open state of the mobile phone, in the case where the force for the closing-direction sliding movement is applied to the upper case 1 without the closing-direction rotation of the upper case 1 or the case where the force for the closing-direction sliding movement is applied to the upper case 1 in the state where the upper case 1 is allowed to slightly rotate in the closing-direction, the closing-direction sliding movement of the upper case 1 may be restricted. In this state, since the user may not slidingly move the upper case 1 in the closing-direction, the user performs the closing-direction rotation manipulation on the upper case 1.

On the other hand, in the case where the force for the closing-direction sliding movement is applied to the upper case 1 during the time when the upper case 1 is allowed to rotate in the closing-direction, the protrusion member 35 that protrudes from the upper case 1 is in contact with the flat surface portion 30*b* of the lock block 30 as shown in FIG. 12, so that the restriction on the closing-direction sliding movement of the upper case 1 is released. In addition, since the protrusion member 35 is in contact with the flat surface portion 30*b* of the lock block 30, the first arm 15 is pressed so as to rotate in the closing direction by the protrusion member 35. In other words, if the protrusion member 35 is in contact with the flat surface portion 30*b* of the lock block 30, the force applied by the closing-direction sliding manipulation is converted into the force for rotating the first arm 15 in the closing-direction.

Therefore, as shown in FIG. 13, it is possible to accelerate the closing-direction rotation operation of the upper case 1 (that is, it is possible to support the closing-direction rotation operation), and it is possible to return the mobile phone to the closed state as shown in FIG. 8A by transferring to the closing-direction sliding manipulation for the upper case 1 after the closing-direction rotation of the upper case 1 is ended.

In other words, in the mobile phone according to the third embodiment, in the case where the closing-direction rotation manipulation that is performed at the time of returning the mobile phone from the open state to the closed state is a rotation manipulation within a range where the protrusion member 35 is in contact with the curved surface portion 30*a* of the lock block 30, although the closing-direction sliding manipulation is performed, the protrusion member 35 is in contact with the curved surface portion 30*a* of the lock block 30, so that the closing-direction sliding manipulation is restricted.

On the other hand, in the case where the closing-direction rotation manipulation that is performed at the time of returning the mobile phone from the open state to the closed state is a rotation manipulation within a range where the protrusion member 35 is in contact with the flat surface portion 30*b* of the lock block 30, by allowing the protrusion member 35 to be in contact with the flat surface portion 30*b* of the lock block 30, the restriction on the closing-direction sliding manipulation is released. In addition, by allowing the protrusion member 35 to be in contact with the flat surface portion 30*b* of the lock block 30, the closing-direction rotation of the first arm 15 may be accelerated, and the closing-direction sliding manipulation may be performed.

[Effect of Third Embodiment]

As clarified from the above description, in the mobile phone according to the third embodiment, about ⅓ of the portion of the flexible board disposed between the upper case 1 and the lower case 2, which is just after the portion exposed from the upper case 1, is adhered to the rear surface portion 1*d* of the upper case 1 by using an adhesive member such as an adhesive or a double-sided tape, so that the problem of the bending flexible board greatly protruding outside the upper case 1 is prevented.

In addition, due to the lock block 30 that rotates together with the first arm 15 and the protrusion member 35 that protrudes from the upper case 1, in the case where the force for the closing-direction sliding movement is applied to the upper case 1 without the closing-direction rotation of the upper case 1 or the case where the force for the closing-direction sliding movement is applied to the upper case 1 in the state where the upper case 1 is allowed to slightly rotate in the closing-direction, the closing-direction sliding manipulation of the upper case 1 is restricted.

In addition, in the case where the force for the closing-direction sliding movement is applied to the upper case 1 during the time when the upper case 1 is allowed to rotate in the closing-direction, the closing-direction rotation operation of the upper case 1 is accelerated (that is, the closing-direction rotation operation is supported), and after the closing-direction rotation of the upper case 1 is ended, the procedure is transferred to the closing-direction sliding manipulation for the upper case 1.

Therefore, the problem of the bending flexible board greatly protruding outside the upper case 1 may be prevented, and at the time of the closing manipulation, the closing-direction sliding manipulation before the ending of the closing-direction rotation manipulation may be restricted. For this reason, it is possible to perform the manipulation of returning the mobile phone from the open state to the closed state according to the regular manipulation procedure spontaneously without the user paying attention (that is, it is possible to correct the user's closing manipulation so as to be the regular manipulation procedure), and it is possible to more effectively prevent the problem of the flexible board being damaged due to insertion of the flexible board between the upper case 1 and the lower case 2.

In addition, since the problem of the flexible board being damaged due to not performing the closing manipulation of the mobile phone according to the regular manipulation procedure may be prevented, it is not necessary for the user to perform the closing manipulation so as for the mobile phone to return from the open state to the closed state according to the regular manipulation procedure.

[Modified Example]

In the aforementioned embodiments, the invention is adapted to a mobile phone. However, the embodiments of the invention may be adapted to personal handyphone systems (PHSs), personal digital assistants (PDAs), mobile game machines, portable music players, and the like. In any one of the above apparatuses, the aforementioned effects may be obtained.

The present application contains subject matter related to that disclosed in Japanese Priority Patent Application JP 2010-001598 filed in the Japan Patent Office on Jan. 6, 2010, the entire content of which is hereby incorporated by reference.

In addition, the aforementioned embodiments are exemplary ones of the invention. Therefore, the invention is not limited to the aforementioned embodiments, but various modifications are available according to design or the like without departing from the spirit of the invention.

What is claimed is:

1. A mobile terminal apparatus comprising:
an upper case;
a lower case;
a sliding rotation mechanism which has a sliding mechanism which is fixed to the upper case to perform a sliding movement on the upper case through a sliding supporting plate for slide-movably supporting the upper case and a rotation mechanism which rotates the upper case with respect to the lower case, which performs an opening-direction sliding movement on the upper case through the sliding supporting plate at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement; and
a protrusion member which is fixed to the upper case so as to protrude from the upper case toward the lower case; and
a lock block which is fixed to the rotation mechanism so as to rotate in cooperation with the rotation mechanism of the sliding rotation mechanism and which is in contact with the protrusion member disposed to the upper case so as to restrict the sliding movement of the upper case when the upper case is allowed to slidingly move in the closing-direction in the state where the upper case is allowed to stand up at the predetermined angle with respect to the lower case.

2. The mobile terminal apparatus according to claim 1, wherein the lock block includes:
a sliding movement restricting member which is in contact with the protrusion member to restrict the closing-direction sliding movement of the upper case in the case where the upper case is allowed to slidingly move in the closing-direction after the closing-direction rotation movement of the upper case within a predetermined range from the state where the upper case is allowed to stand up at the predetermined angle with respect to the lower case; and
a sliding movement restriction releasing member which is in contact with the protrusion member to release the restriction on the closing-direction sliding movement of the upper case in the case where the upper case is allowed to slidingly move in the closing-direction after the closing-direction rotation movement of the upper case beyond the predetermined range from the state where the upper case is allowed to stand up at the predetermined angle with respect to the lower case.

3. The mobile terminal apparatus according to claim 1 or 2, wherein the sliding rotation mechanism includes:
the sliding mechanism having the sliding supporting plate; and
the rotation mechanism having a first arm of which the one end portion is rotatably connected to the sliding supporting plate and of which the other end portion is rotatably connected to the lower case and a second arm which is disposed in parallel to the first arm according to a direction of the sliding movement of the upper case, of which the one end portion is rotatably connected to the sliding supporting plate, and of which the other end portion is rotatably connected to the lower case, and
wherein the lock block is fixed to the one end portion of the first arm so as to rotate in cooperation with the first arm of the rotation mechanism.

4. A mobile terminal apparatus comprising:
an upper case;
a lower case;
a sliding rotation mechanism which is fixed to the upper case, which has a sliding mechanism which performs sliding movement on the upper case through a sliding supporting plate for slide-movably supporting the upper case and a rotation mechanism which rotates the upper case with respect to the lower case, which performs an opening-direction sliding movement on the upper case through the sliding supporting plate at the time of an opening manipulation, which allows the upper case to stand up at a predetermined angle with respect to the lower case by performing an opening-direction rotation movement on the upper case through the sliding supporting plate after the opening-direction sliding movement, which performs a closing-direction rotation movement opposite to the opening-direction rotation movement on the upper case, which allows the upper case to stand up at the predetermined angle with respect to the lower case through the sliding supporting plate at the time of a closing manipulation, and which performs a closing-direction sliding movement opposite to the opening-direction sliding movement on the upper case through the sliding supporting plate after the closing-direction rotation movement;
a protrusion member which is fixed to the upper case so as to protrude from the upper case toward the lower case;
a lock block which is fixed to the rotation mechanism so as to rotate in cooperation with the rotation mechanism of the sliding rotation mechanism and which is in contact with the protrusion member disposed to the upper case so as to restrict the sliding movement of the upper case when the upper case is allowed to slidingly move in the closing-direction in the state where the upper case is allowed to stand up at the predetermined angle with respect to the lower case; and
a flexible board which is disposed between the upper case and the lower case so that electrical parts disposed in the upper case and electrical parts disposed in the lower case are electrically connected to each other, wherein the flexible board includes a first portion exposed from the upper case, and wherein the flexible board includes a second portion, just after the first portion, that is adhered to the sliding supporting plate through an adhesive member.

5. The mobile terminal apparatus according to claim 4, wherein the lock block includes:

- a sliding movement restricting member which is in contact with the protrusion member to restrict the closing-direction sliding movement of the upper case in the case where the upper case is allowed to slidingly move in the closing-direction after the closing-direction rotation movement of the upper case within a predetermined range from the state where the upper case is allowed to stand up at the predetermined angle with respect to the lower case; and
- a sliding movement restriction releasing member which is in contact with the protrusion member to release the restriction on the closing-direction sliding movement of the upper case in the case where the upper case is allowed to slidingly move in the closing-direction after the closing-direction rotation movement of the upper case beyond the predetermined range from the state where the upper case is allowed to stand up at the predetermined angle with respect to the lower case.

6. The mobile terminal apparatus according to claim 4 or 5, wherein the sliding rotation mechanism includes:

the sliding mechanism having the sliding supporting plate; and the rotation mechanism having a first arm of which the one end portion is rotatably connected to the sliding supporting plate and of which the other end portion is rotatably connected to the lower case and a second arm which is disposed in parallel to the first arm according to a direction of the sliding movement of the upper case, of which the one end portion is rotatably connected to the sliding supporting plate, and of which the other end portion is rotatably connected to the lower case, and wherein the lock block is fixed to the one end portion of the first arm so as to rotate in cooperation with the first arm of the rotation mechanism.

* * * * *